(12) United States Patent
Selgert et al.

(10) Patent No.: US 8,644,793 B2
(45) Date of Patent: Feb. 4, 2014

(54) METHOD OF DETERMINING A LOCATION OF A MOBILE DEVICE AND METHOD OF MANAGING A LIST FOR USE IN SUCH A METHOD

(75) Inventors: Franklin Selgert, Berkel en Rodenrijs (NL); Antonius Hendrikus Johannes Norp, The Hague (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 383 days.

(21) Appl. No.: 12/639,758

(22) Filed: Dec. 16, 2009

(65) Prior Publication Data

US 2010/0159949 A1  Jun. 24, 2010

(30) Foreign Application Priority Data

Dec. 18, 2008  (EP) .................................... 08021968

(51) Int. Cl.
*H04M 11/04* (2006.01)

(52) U.S. Cl.
USPC .................. 455/404.2; 455/414.1; 455/414.2; 370/328; 370/338

(58) Field of Classification Search
USPC ...................... 455/404.2, 422.1, 141.1–141.4, 455/436–444, 456.1–456.6; 370/328, 338
See application file for complete search history.

(56) References Cited

U.S. PATENT DOCUMENTS

| | | | |
|---|---|---|---|
| 6,968,194 B2 | 11/2005 | Aljadeff et al. | |
| 7,433,673 B1 | 10/2008 | Everson et al. | |
| 2003/0218570 A1 | 11/2003 | Moore et al. | |
| 2004/0014474 A1 | 1/2004 | Kanada | |
| 2004/0203914 A1* | 10/2004 | Kall et al. | 455/456.1 |
| 2006/0184680 A1* | 8/2006 | Ruutu et al. | 709/229 |
| 2007/0207815 A1 | 9/2007 | Alfano et al. | |
| 2009/0061892 A1* | 3/2009 | Lee et al. | 455/456.1 |
| 2011/0201354 A1* | 8/2011 | Park et al. | 455/456.1 |

FOREIGN PATENT DOCUMENTS

| | | |
|---|---|---|
| EP | 1545146 | 6/2005 |
| EP | 1802154 | 6/2007 |
| WO | WO 02/082850 | 10/2002 |
| WO | WO 2004/008171 | 1/2004 |
| WO | WO2004/064327 | 7/2004 |
| WO | WO2004/077753 | 9/2004 |
| WO | WO2005/050965 | 6/2005 |

OTHER PUBLICATIONS

European Search Report, European patent application 08021968.6, dated Jun. 3, 2009.
EP Search Report, European Patent Application 08022092.4 dated Jul. 27, 2009.
EP Search Report, European Patent Application 08022077.5 dated Jun. 30, 2009.

* cited by examiner

*Primary Examiner* — Erika A Gary
*Assistant Examiner* — Marisol Fahnert
(74) *Attorney, Agent, or Firm* — McDonnell Boehnen Hulbert & Berghoff LLP

(57) ABSTRACT

Methods of determining a location of a mobile device in a first communication network are presented. The mobile device is in communication with a cellular base station in a second communication network. First, access points within the first communication network are detected with the mobile device. Then, one or more of the detected access points is selected based on information provided by the cellular base station. Finally, the location of the mobile device is determined based on the selected access points.

24 Claims, 6 Drawing Sheets

METHOD OF DETERMINING A LOCATION OF A MOBILE DEVICE AND METHOD OF MANAGING A LIST FOR USE IN SUCH A METHOD

FIELD

The invention relates to a method of determining a location of a mobile device. Additionally, the invention relates to a mobile device using such a method. Furthermore, the invention relates to a method of managing a list of records of access points located within a coverage area of a cellular base station. Additionally, the invention relates to a cellular base station using such a method. Finally, the invention relates to an access point for use in such a method.

BACKGROUND

Nowadays, the use of mobile devices, e.g. personal digital assistants, portable computers and mobile phones, for wireless communication purposes is widespread. Furthermore, new applications for these devices are rapidly emerging. In many of these new applications, services are provided which relate to functionality to the end user of the mobile device based on its location, so called Location Based Services (LBS). Such services include for example providing navigational support, providing a local weather forecast or searching for a nearby restaurant.

Depending on the type of service to be provided, different methods of determining the location of the mobile device can be applied. Some services require very accurate locations, while others only need to know the location in a more general fashion.

Well-known methods of determining the location of a mobile device are based on the location of a base station of the radio cell the mobile device is camped on. In these methods, localization may for example be based on cellular base station identifiers sent by cellular base stations in the network. If the mobile device knows the geographic location of the base stations corresponding to the base station identifiers, it can determine its position. The determination may be done by assuming that the position of the mobile device coincides with the closest base station, by calculating the position using a triangulation technique based on positions of surrounding base stations, or by using other techniques known to a person skilled in the art.

Because the coverage area of a cellular base station is relatively large, the accuracy of the localization will be relatively low. This may become an issue for future mobile device applications, in particular if these applications involve LBS that need a very accurate location determination. Especially in buildings, the location determination can be improved, e.g. to determine on which floor the mobile device is located.

One way to improve the accuracy of the determined position is to base the location determination on wireless access points, e.g. access points used in a wireless local area network (WLAN). Wireless access points generally have a smaller coverage area than cellular base stations. Furthermore, wireless access points are often located in buildings. By using access point identifiers, Service Set Identifier (SSID) in WLAN, a more precise location determination is possible. A method of determining a location of a mobile device based on wireless access points is described in U.S. Pat. No. 6,968,194. A wireless access point that is equipped to be used in such a method has for example been described in European patent application 1802154.

In order to perform a location determination based on access point identifiers, an accurate location of the wireless access points themselves is needed. Unlike cellular base stations, wireless access points are often installed by the general public, not specifically skilled in operating (wireless) communication technology. As a result, a person may install a wireless access point without knowing how to assign a correct address or may forget to change the location of the wireless access point after moving the wireless access point to a new location. A three-point location determination based on three wireless access points, also referred to as triangulation, of which one access point has an inaccurate or incorrect address, will result in an erroneous location of the mobile device.

SUMMARY

A further improvement of precision with respect to the location of a mobile device is desirable in view of future applications for a mobile device. For this purpose, an accurate location of the wireless access points themselves is desirable. It is an object of embodiments to provide a method of accurately determining a location of a mobile device with improved reliability as compared to the prior art.

For this purpose, the embodiments relate to a method of determining a location of a mobile device in a first communication network, the mobile device being in communication with a cellular base station in a second communication network, the method comprising:

detecting access points within the first communication network with the mobile device;

selecting one or more of the detected access points based on information provided by the cellular base station; and determining the location of the mobile device based on the selected access points.

The information provided by the cellular base station may comprise records regarding access points within the first communication network that are indicated as being located within a coverage area of the cellular base station. The method enables the mobile device to accurately determine its location with higher reliability. The assistance of the base station in the second network facilitates a selection of access points with more reliable information regarding their positions.

The information in the form of records may be used for the selecting, e.g. by excluding detected access points for which no record is present in the list. Such a list only comprises records regarding access points whose position is "reliable".

The list may be provided in response to sending a request towards the cellular base station. In this arrangement, the capacity of a broadcast channel of the base station is not burdened unnecessarily. Alternatively, the list may be provided via a broadcast channel. This arrangement saves time, as the mobile device can obtain the list without a need to send a request and wait for a response.

The nominal coverage area of the cellular base station in the second communication network may be larger than a nominal coverage area of an access point within the first communication network. A large coverage area of the base station in the second network enables uncomplicated location determination over a large geographical area, e.g. by the use of a single list in a way as described above. A small coverage area of an access point facilitates location determination with high accuracy.

In embodiments of the method, the method further comprises reporting to the cellular base station in the second communication network which access points in the first communication network have been detected. The reporting may serve as a check on the access points' positions. In general, the smaller the coverage area of the access points compared to the size of the coverage area of the base station, the greater the accuracy improvement will be from use of the feedback.

The embodiments relate to a mobile device arranged to be part of a first communication network and a second communication network, the mobile device comprising:
- a receiver for receiving data from one or more access points in the first communication network and/or the second communication network;
- a transmitter for transmitting data towards one or more access points in the first communication network and/or the second communication network;
- a memory for storing data;
- a processor for processing data received via the receiver and/or stored in the memory;

wherein the mobile device is arranged to perform embodiments of the aforementioned method.

The embodiments relate to a method of managing a list for use in a cellular base station within a second communication network, the list comprising records regarding access points within a first communication network that are indicated as being located within a coverage area of the base station, the method comprising:
- receiving a message from an access point within the first communication network regarding its position;
- checking whether the position of the access point is located within the coverage area;
- updating the list if the position is located within the coverage area.

This method performs well if the base station knows its position and coverage area, and if the messages contain correct positions of the access points. Generally, the first condition is met because installment by a provider at a certain position is based on a planning of the second network which involves planning of position and coverage area of the base stations to be installed. In order to verify that the second condition is met, several measures may be taken to improve the reliability of the position reported by the access points and used to determine whether or not the list should be updated to include a particular access point record. These measures may include one or more of the following. The access point records may comprise information representative of the identity of the respective cells. In such a case, the updating may include adding an access point record if the information representative of the identity of the respective access point is not present in the list. The access point record may further comprise information representative of the position of the access point. Then the updating may further include amending an access point record if the information representative of the identity of the respective access point is present in the list, but the information representative of the position of the access point in the stored access point record is different from the information representative of the position of the access point in the message.

In embodiments, the updating only occurs if one or more mobile devices have reported that the access point has been detected. The received reports may be used as a check on the access points' positions. In general, the smaller the coverage area of the access points compared to the size of the coverage area of the base station, the greater the accuracy improvement will be from use of the feedback.

The embodiments relate to a cellular base station comprising:
- a receiver for receiving data from one or more access points in the first communication network and/or the second communication network;
- a transmitter for transmitting data towards one or more access points in the first communication network and/or the second communication network
- a database for storing data;
- a processor for processing data received via the receiver and/or stored in the memory;

wherein the base station is arranged to perform an embodiment of aforementioned method of managing a list.

The receiver of the base station may be arranged to receive a request from a mobile device for providing the list to the mobile device. The base station may then be arranged to provide the list via the transmitter in response to such request. In this embodiment, the capacity of a broadcast channel of the base station is not burdened unnecessarily. Alternatively, the transmitter of the base station may be arranged to transmit the list via a broadcast channel. Such an embodiment saves time, as the mobile device can obtain the list without a need to send a request and wait for a response.

Finally, the embodiments relate to an access point within a first communication network, the access point comprising:
- an access point memory storing information representative of the identity of the access point and information representative of the position of the access point;
- a receiver for detecting one or more cellular base stations within a second communication network;
- a processor for enabling transmission of the access point identifier and information representative of the position of the access point to the one or more cellular base stations upon detection.

In embodiments, the access point comprises a position determination unit, e.g. a global positioning system (GPS) receiver, for determining the position of the access point and storing the position in the access point memory. The use of a position determination unit enables the access point to determine its location in a relatively reliable manner.

Further aspects of the invention and embodiments as defined in the claims will be clarified with reference to the attached drawings and corresponding description. It will be understood that the invention is not in anyway restricted to the embodiments disclosed in these drawings.

DESCRIPTION

The following is a description of certain embodiments of the invention, given by way of example only.

Throughout the description, the expression "coverage area" has been used to refer to a geographical area in which signals can be received from a transmitter in a communication network. For clarity reasons, a coverage area of a transmitter has been depicted as a circle. However, it must be understood that a shape of a coverage area as defined above depends on the actual circumstances and may have any other shape. Coverage areas of access points within a communication network may vary in size, e.g. due to ambient conditions, settings of the access point, etc. For this reason, circles of different radius have been depicted in figures supporting the description.

Figure 1:
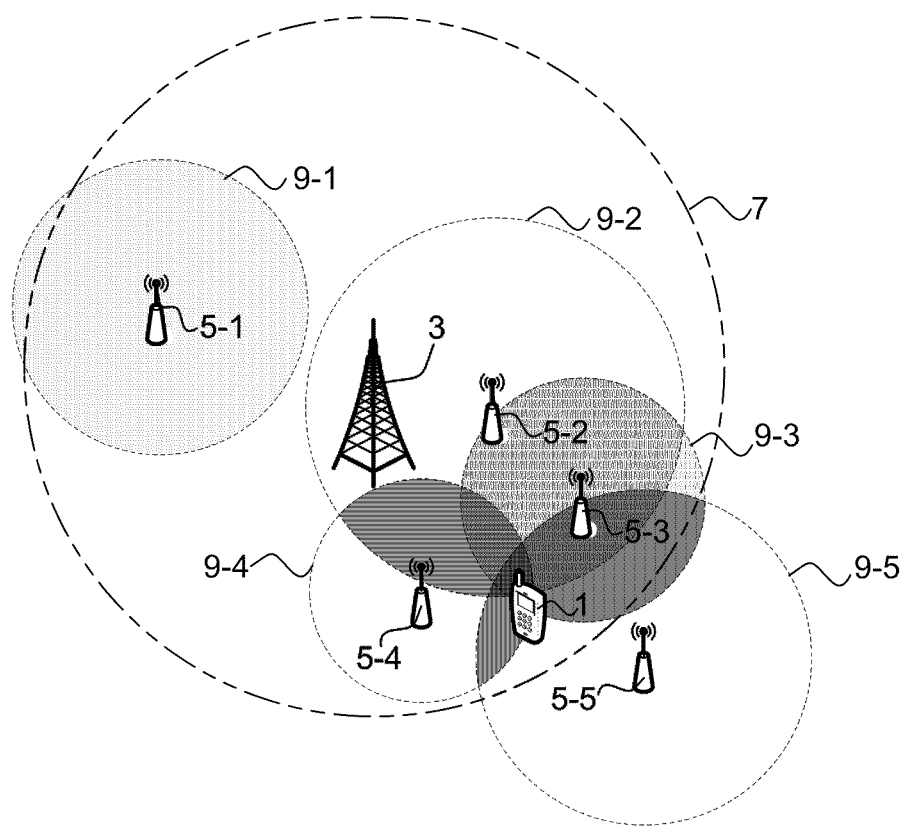
FIG. 1 schematically depicts an exemplary network architecture in which embodiments can be implemented.

FIG. 1 schematically depicts an exemplary network architecture in which the embodiments can be implemented. The depicted network architecture comprises a mobile device 1, a cellular base station 3 and a number of access points 5-1 to 5-5, which may be, for example, wireless access points. The cellular base station 3 has a coverage area 7. The access points 5-1 to 5-5 have coverage areas 9-1 to 9-5 respectively.

The mobile device 1 is positioned within a coverage area 7 of the base station 3 and is camped on the base station 3. The mobile device 1 is further positioned within coverage areas of one or more cells, i.e. in FIG. 1 coverage areas 9-2 to 9-5 of access points 5-2 to 5-5 respectively.

The access points 5-1 to 5-5 are part of a first communication network. The cellular base station 3 is part of a second communication network. The mobile device 1 is arranged to be part of both the first communication network and the second communication network. Hereinafter the first communication network will be referred to as the first network, and the second communication network will be referred to as the second network.

The first network may be a wireless communication network, and may be arranged to support a first type of radio technology. The first type of radio technology may typically comprise a shorter-range wireless communication technology such as Bluetooth™, Radio Frequency Identification (RFID), WLAN, Worldwide Interoperability for Microwave Access (WIMAX™), Near Field Communication (NFC), Ultra Wide Band (UWB), Zigbee™, Digital Enhanced Cordless Telecommunications (DECT), Wibree™, and other suitable technologies. In the example shown in FIG. 1, the access points 5-1 to 5-5 and the mobile device are equipped with interfaces for communication using the first type of radio technology.

The second network may be arranged to support a second type of radio technology. The second type of radio technology may typically comprise a standard cellular radio technology used for mobile phones, such as Global System for Mobile telecommunications (GSM), Universal Mobile Telecommunications System (UMTS), Wideband Code Division Multiple Access (WCDMA), Long Term Evolution (LTE), Interim Standard 95 (IS-95), Code Division Multiple Access 2000 (CDMA2000), WIMAX, Digital Video Broadcasting (DVB), technologies related to a private mobile radio standard like Terrestrial Trunked Radio (TETRA), technologies related to a satellite communication standard provided by a standard body like the International Mobile Satellite Organization (InMarSat) or other suitable technologies. In the example shown in FIG. 1, the base station 3 and the mobile device 1 are equipped with interfaces for communication using the second type of radio technology.

It is also possible that the second type of radio technology may be selected from the first list provided above, or that the first type of radio technology may be selected from the second list provided above.

Figure 2:
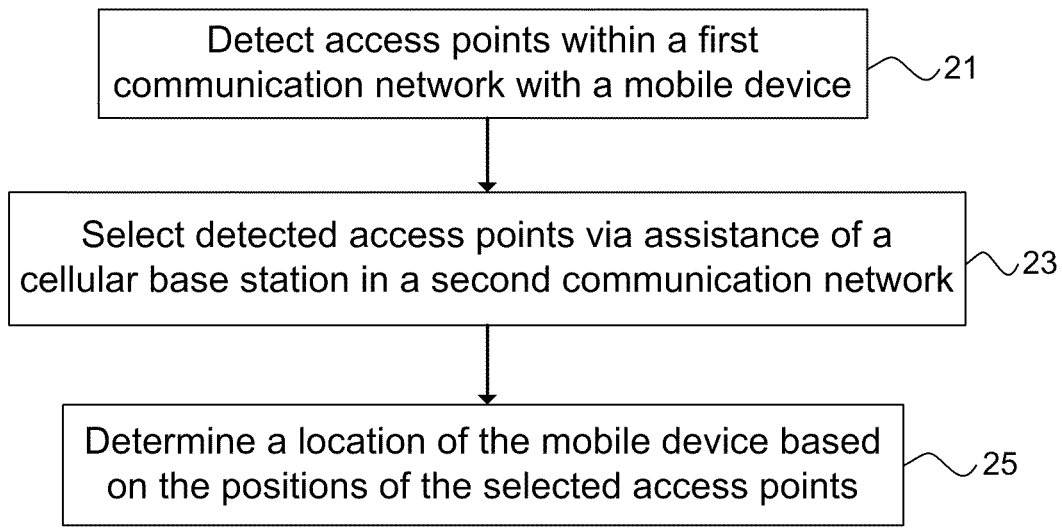
FIG. 2 schematically depicts an embodiment of a method of determining a location of a mobile device.

FIG. 2 schematically depicts a flow diagram of an embodiment of a method of determining a location of a mobile device. The method in FIG. 2 will be explained with reference to the exemplary network architecture depicted in FIG. 1.

In the shown embodiment, in action 21, access points within a first network are detected with a mobile device. The mobile device 1 may detect the access points by scanning for signals transmitted by the access points. In FIG. 1, the mobile device 1 is able to receive signals transmitted by access points 5-2, 5-3, 5-4 and 5-4, because it is positioned in their respective coverage areas, i.e. coverage areas 9-2, 9-3, 9-4 and 9-5 respectively. Although access point 5-1 is positioned within the coverage area 7 of the cellular base station 3, the mobile device 1 does not detect access point 5-1. Therefore, access point 5-1 will not be used in further actions of the method of determining a location of a mobile device according to the embodiments.

Then, in action 23, detected access points are selected with the assistance of a base station in a second network, i.e. in FIG. 1 cellular base station 3.

Finally, in action 25, a location of the mobile device is determined based on positions of the selected access points.

The method schematically depicted enables the mobile device to accurately determine its location with higher reliability. The assistance of the base station in the second network facilitates a selection of access points with more reliable information regarding their positions.

Providing assistance to the mobile device for selecting certain access points out of a group of detected access points may be done in the following way. The base station may be arranged to provide a list of records regarding access points within the first network that are located within the coverage area of the base station. The base station could manage the list in such a way that only access points that are confirmed to be in its coverage area are listed. Thus, the list only comprises records regarding access points whose position is "reliable".

In the exemplary network architecture depicted in FIG. 1, the list would be provided by base station 3 and would contain access point records of the access points located within the coverage area 7, i.e. access points 5-1, 5-2, 5-3 and 5-4.

The list may be provided in response to sending a request by the mobile device to the base station. The base station then provides the list when needed. In this arrangement, the capacity of a broadcast channel of the base station is not burdened unnecessarily.

Alternatively, the list may be provided via the broadcast channel, i.e. the base station may be arranged to broadcast the list via a broadcast channel. Such an embodiment saves time, as the mobile device can obtain the list without a need to send a request and wait for a response.

The selecting in action 23 may comprise excluding detected access points for which no record is present in the list provided by the base station. In FIG. 1, access points 5-2, 5-3, 5-4 and 5-5 will be detected by the mobile device 1. However, access point 5-5 is not located within the coverage area 7 of the base station 3, and will therefore not be on the list provided to mobile device 1. Because there is no further information regarding the reliability of the position of access point 5-5, this access point may be excluded for further use in the method of determining the location of the mobile device 1.

The access point records in the list may include information representative of the identity of the access point, hereinafter referred to as access point identifier. The access point identifier may take the form of a Media Access Control (MAC) address, an SSID, or other suitable code for identifying the access point. The list of access point records may be stored in the mobile device. A record may further comprise information representative of the position of the access points, hereinafter referred to as position information. This access point position information will usually originate from the access point itself, e.g. having been stored in a memory of the access point upon installation of the access point, or may originate from some other location in the network. The access point may transmit the position information to the mobile device 1, e.g. via a broadcast channel.

Once certain access points have been selected, the location of the mobile device is determined in action 25, based on the positions of the selected access points. This may be accomplished in various ways, depending on the number of access points selected and the information available. For example, if there is only one selected access point, it can be assumed that the location of the mobile device coincides with that access point. The access point position information is then used as the mobile device location. If there is more than one selected access point, the location of the mobile device may be determined by calculating a position in between the selected access points using the access point position information of each selected access point. For example, if there are two selected cells, the location of the mobile device may be assumed to be mid-way between the two access points. If there are three or more selected cells, the location of the mobile device can be calculated using a triangulation technique.

These methods rely on the access point position information, but other information may also be used in addition to the position information. For example, where feasible, the strength of the signals from the selected access points may be used in calculating the distance of the mobile device from an access point, the direction from which the signals from the selected access points originate, or the phase of the signals from the selected cells, may be used in calculating the location of the mobile device.

Application of the method schematically depicted in FIG. 2 to provide the location of the mobile device 1 within the exemplary network architecture schematically depicted in FIG. 1, results in determining the location based on the positions of access points 5-2, 5-3 and 5-4. These are the access points that were both detected by the mobile device and confirmed by the base station.

In the embodiments, the mobile device may report to the base station which access points were detected during action 21. If one or more mobile devices have reported an access point from within the coverage area of the base station, the base station then assumes that the access point is located within its coverage area and adds the access point to the list. Similarly, if during a certain period of time, or by a number of mobile devices being located within the coverage area of the base station, no mobile device has reported that an access point is detected even though the access point is present on the list, the base station may decide to remove the access point from the list. More details regarding list management will be discussed with reference to FIG. 3, which describes an embodiment of a method of managing such a list.

Embodiments of the method of determining a location of a mobile device become more efficient if a nominal coverage area of the base station in the second network is larger than a nominal average coverage area of an access point within the first network. A large coverage area of the base station in the second network enables uncomplicated location determination over a large geographical area, e.g. by the use of a single list in a way as described above. A small coverage area of an access point facilitates location determination with high accuracy.

Figure 3:
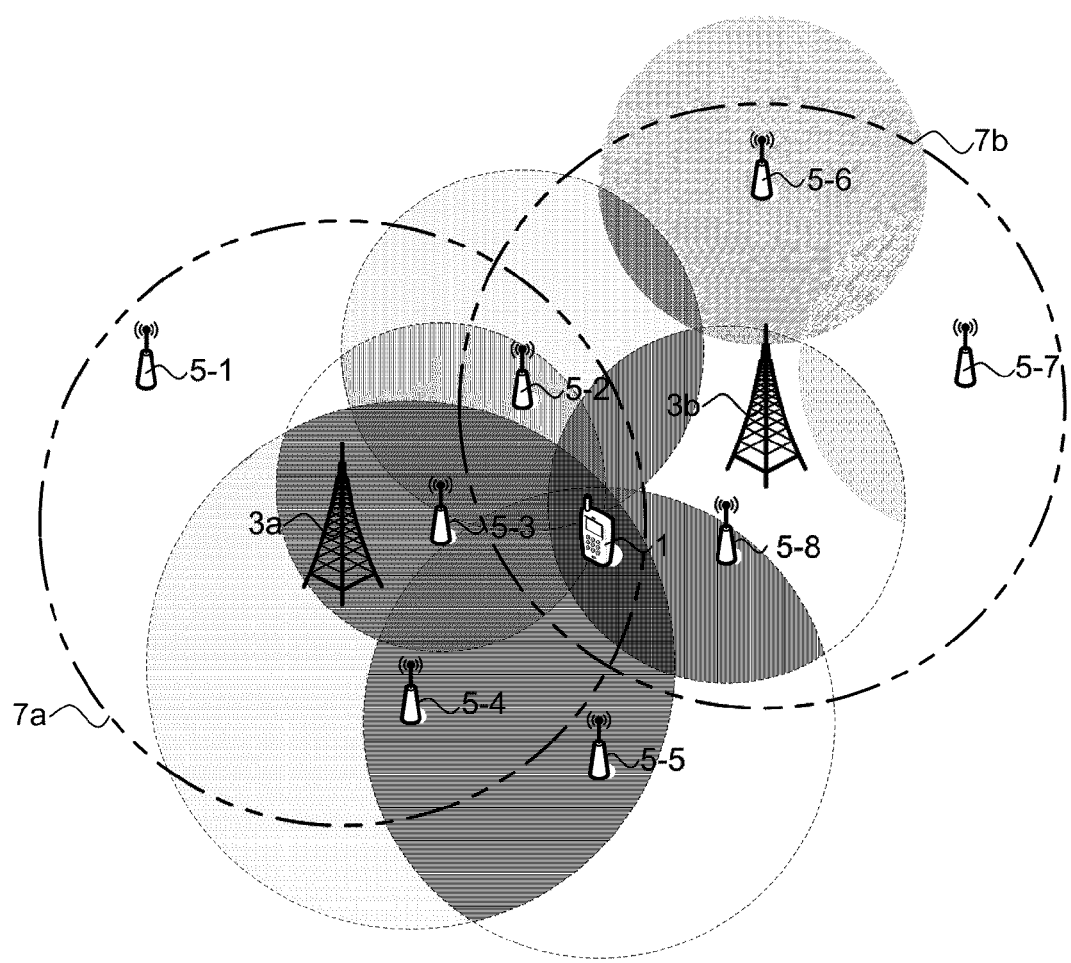
FIG. 3 schematically depicts another exemplary network architecture in which embodiments can be implemented.

The method described with reference to FIG. 2 may also be applied in situations where the mobile device 1 is located within a coverage area of more than one base station 3. FIG. 3 schematically depicts an exemplary network architecture in which the mobile device 1 is positioned within a coverage area of two different base stations, i.e. a first cellular base station 3a and a second cellular base station 3b. The base stations 3a, 3b have a first coverage area 7a and a second coverage area 7b respectively.

The network architecture further comprises a number of access points 5-1 to 5-8, e.g. wireless access points, that are part of the first network. The base stations 3a, 3b are part of the second network. Again, the mobile device 1 is arranged to be part of both the first and the second network.

Figure 4:
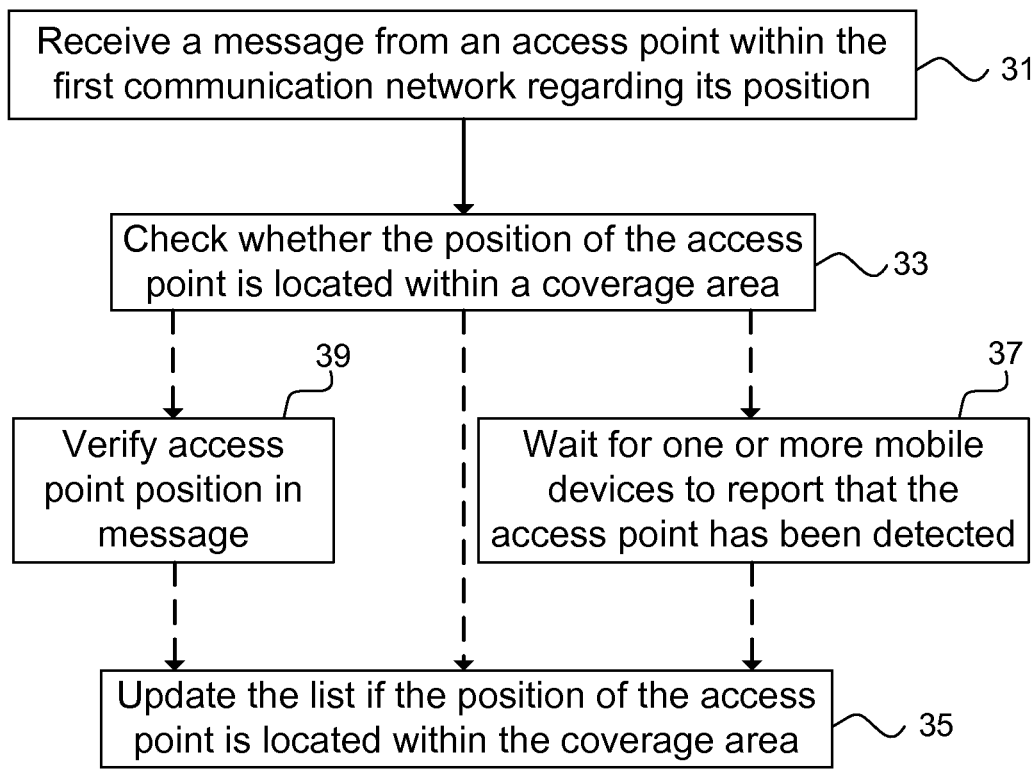
FIG. 4 schematically depicts an embodiment of a method of managing a list of records of access points that are located within the coverage area of a cellular base station.

In the exemplary network architecture schematically depicted in FIG. 4, the mobile device 1 may perform the method as schematically shown in FIG. 2. The detection action remains similar to the one described with reference to FIG. 2. However, in the exemplary network architecture of FIG. 4, the selecting may be performed with assistance of either one of or both base stations 3a, 3b. In an embodiment, the first base station 3a provides a first list, and the second base station 3b provides a second list to the mobile device 1. The first list comprises records of access points within the first network that are located within the first coverage area 7a, i.e. access points 5-1, 5-2, 5-3 and 5-4. The second list comprises records of access points within the first network that are located within the second coverage area 7b, i.e. access points 5-2, 5-6, 5-7 and 5-8. Both lists may be stored within the mobile device 1. Alternatively, the mobile device 1 may facilitate a merging of the two lists into a single list to be stored.

The action of detecting results in the detection of access points 5-2, 5-3, 5-4, 5-5 and 5-8. In embodiments using one or more lists as described above, detected access points 5-2, 5-3 and 5-4 are present on the first list. Furthermore, detected access points 5-2 and 5-8 are present on the second list. Note that detected access point 5-5 is neither present on the first list nor on the second list. Access point 5-5 will therefore be excluded from use in the action of determining.

Determining the location of the mobile device 1 may then based on the positions of the detected access points that are present on the first list or second list, i.e. in the exemplary network architecture of FIG. 3, access points 5-2, 5-3, 5-4 and 5-8. Alternatively, determining the location of the mobile device 1 may be based on the positions of detected access points that are present on both the first list and the second list, access point 5-2. The latter embodiment is generally more accurate.

It can be readily understood that the method of determining a location of a mobile device as described with reference to FIGS. 1-3. If the assistance provided by the base station is highly reliable and up to date. That is, in case a list is used as discussed with reference to FIG. 2, only access point records of access points that are actually within the coverage area of the base station should be present in the list.

Generally, within a coverage area of a base station in the second network, the number and locations of access points within the first network vary. For example, new access points may be activated or deactivated, access points may change location within the coverage area of the base station, or access points may move inside or outside the coverage area.

FIG. 4 schematically depicts an embodiment of a method of managing a list for use in a base station in a second network, the list comprising records of access points within a first network that are located within the coverage area of the base station, e.g. base station 3 in FIG. 1 or base station 3a, 3b in FIG. 3. An access point record comprises an access point identifier for identifying the access point. Furthermore, the access point record may comprise information representative of the position of the access point. The managing method will be discussed with reference to the situation where the list is stored in the base station. However, it should be noted that, alternatively, the list may be stored in a data storage mode of the second network, and forwarded as needed.

First, in action 31, the base station receives a message from an access point within the first network regarding its position. The base station may be part of the second network. The message may then be received via a communication interface within that network.

Alternatively and/or additionally, the message may be sent via a fixed network, e.g. Internet or a Public Switched Telephone Network (PSTN).

In action 33, upon reception of the message in action 31, the base station checks whether the position mentioned by the access point is located within its coverage area. The coverage area of a base station may vary over time, e.g. as a consequence of atmospheric changes. Therefore, the coverage area used in the check of action 33 may relate to a nominal coverage area or an average area covered by the base station under most conditions. If the position mentioned by the access point is located within the coverage area of the base station, the list may be updated in action 35.

This method performs well if the base station knows its position and coverage area, and if the messages contain correct positions of the access points. Generally, the first condition is met because installment by a provider at a certain position is based on a planning of the second network which involves planning of position and coverage area of the base stations to be installed. In order to verify that the second condition is met, several measures may be taken to improve the reliability of the position reported by the access points and used to determine whether or not the list should be updated to include a particular access point record. The term "reliability" refers to the chance that an access point is actually located within the coverage area of the base station if the access point is present in the list. The higher the chance that the access point is indeed located within the coverage area of the base station, the higher the reliability.

In an embodiment, the base station receives feedback from one or more mobile devices in its coverage area to confirm that the access points which report that they are in the base station's coverage area are actually there. Where a mobile device is in communication with the base station and is thus in its coverage area, the mobile device may send the base station information about the access points which the mobile device has detected. This operates as a check on the access points' positions. In general, the smaller the coverage area of the access points compared to the size of the coverage area of the base station, the greater the accuracy improvement will be from use of this feedback.

For example, after checking whether the position reported by an access point is located within the coverage area in action 33, the base station may waits before performing action 35, i.e. updating the list, until one or more mobile devices have reported that the access point has been detected in action 37. The fact that a mobile device, which is in communication with the base station, is able to detect the access point, implies that there is a reasonable chance that the access point is located within the coverage area of the base station.

For example, in FIG. 3, access point 5-7 is located outside the coverage area 7a of the base station 3a, and within the coverage area 7b of base station 3b. The access point 5-7 could communicate with base stations 3a, 3b via a fixed network and report in a message a position that is located within coverage area 7a and outside coverage area 7b. This message contains an erroneous position, but the base station 3a recognizes that this position is located within its coverage area, and therefore may update the list to include access point 5-7. On the other hand, base station 3b recognizes that this position is located outside its coverage area, and therefore does not update the list to include access point 5-7. By using action 37, access point 5-7 will not be added to the list of base station 3a because the mobile device 1 cannot detect access point 5-7. On the other hand, a mobile device 1 located within the coverage area of base station 3b may be able to detect the access point 5-7 and report its detection to base station 7b.

The base station may want to have more than one mobile device to detect the access point to improve the reliability even further. If a number of mobile devices detect the access point 5-7 while in communication with base station 7b, the base station 7b may decide to add the access point 5-7 to the list. Furthermore, other errors may be avoided.

For example, in FIG. 1, access point 5-5 is located outside the coverage area 7 of the base station 3. The access point 5-5 could communicate with base station 3 via a fixed network and report in a message a position that is located within the coverage area 7. This message contains an erroneous position, but, without performing an additional action such as action 37, the base station 3 may not detect the error and may update its list to include access point 5-5.

The mobile device 1 in FIG. 1 will detect access point 5-5. However, because the coverage areas of base station 3 and access point 5-5 only have a small overlapping area, a mobile device located at many other positions within the coverage area of the base station 3 will not detect access point 5-5. Therefore, if many mobile devices in communication with the base station 3 do not detect access point 5-5, and only a few do, the base station 3 may decide not to update its list to include access point 5-5.

Alternatively or additionally, further measures may be taken to improve the reliability of the list. In an embodiment, the base station may verify the position reported by the access point via the message in action 39. If the verification reveals that the position is correct, the base station may proceed to action 35, i.e. updating the list. Verification may be performed by transmitting a request to the access point and analyzing the response. If the base station and the access point can both communicate on the same communication network, the verification can be sent via this network. For example, if the access point is equipped with an interface for communicating via the second network, the verification request can be sent via this network. If the base station is located within the coverage area of the access point, the access point can send a response via the second network as well. If the base station is equipped with an interface for communicating via the first network, the verification request can be sent via the first network. If the base station is located within the coverage area of the access point, the access point can send a response via the first network as well. If the base station is not part of the first network and/or is not located within the coverage area of the access point, a verification response may be sent via a fixed network, e.g. Internet or a PSTN.

In general, the smaller the coverage area of the access points compared to the size of the coverage area of the base station, the greater the accuracy improvement will be from use of this additional verification.

For example, in FIG. 1, access point 5-5 is located outside the coverage area 7 of base station 3. Access point 5-5 could try to contact base station 3 via a fixed network and erroneously report a position within the coverage area 7. The verification action performed by base station 3 does not result in a response by the access point 5-5, because access point 5-5 cannot be reached by the base station via the first and/or second network. Hence, access point 5-5 will not be included in the list.

The updating in action 35 may include adding an access point record if the access point identifier is present in the list. The updating may further include amending an access point record if there is an access point record in the list that includes the access point identifier mentioned in the message, but the information representative of the position of the access point in the stored access point record is different from the position information in the message from the access point. The latter situation may occur if an access point is moved from a first position to a second position, where both the first and second position are located within the coverage area of the base station.

Figure 5:
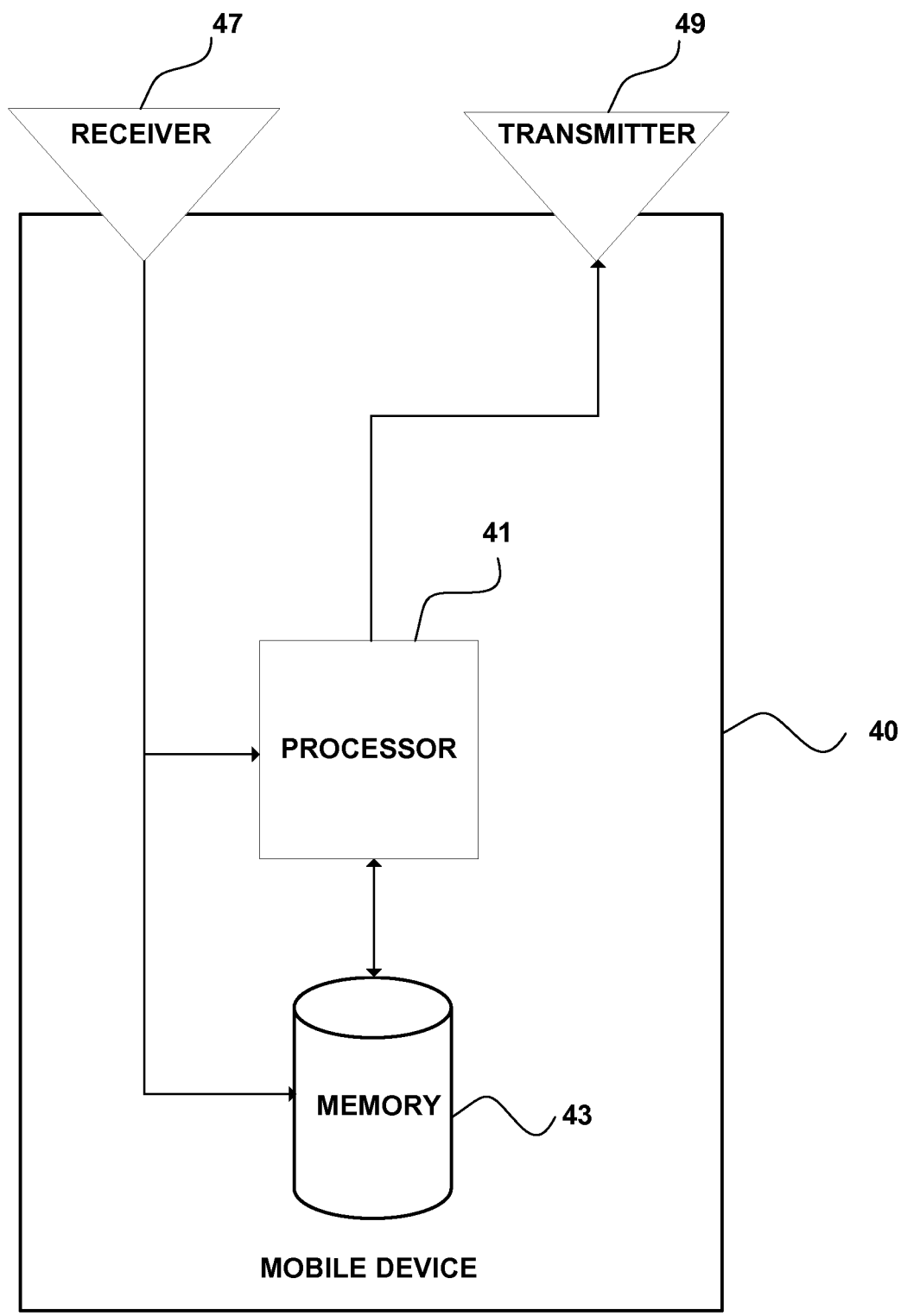
FIG. 5 schematically depicts a mobile device according to an embodiment.

FIG. 5 schematically depicts an embodiment of a mobile device 40 according to an embodiment. The mobile device 40 is arranged to perform embodiments of a method of determining a location of a mobile device in a first network, e.g. the method schematically depicted in and explained with reference to FIG. 2. The mobile device in FIG. 5 comprises a processor 41, a memory 43, a receiver 47 and a transmitter 49. The processor 41 is communicatively coupled to the memory 43. The processor 41 may comprise a control unit to control signals received by the receiver 47 and signals to be sent via the transmitter 49, e.g. for the purpose of controlling detection. The receiver 47 may be arranged to operate within the first network and the second network. Alternatively, the mobile device may comprise two receivers, a first receiver arranged to operate within the first network, and a second receiver arranged to operate within the second network.

Figure 6:
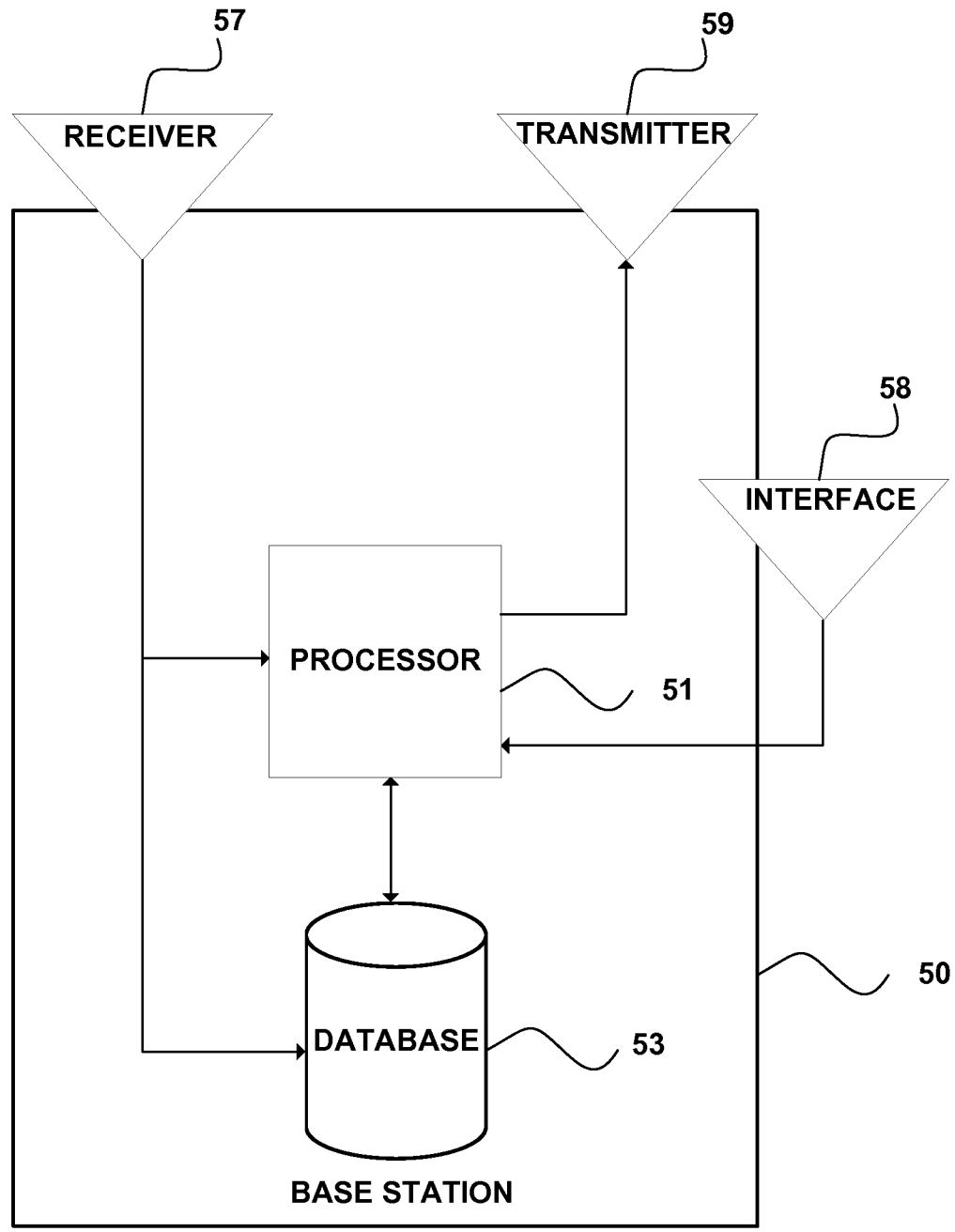
FIG. 6 schematically depicts an embodiment of a cellular base station that may be used in embodiments.

FIG. 6 schematically depicts an embodiment of a base station 50 that may be used in the embodiments shown in FIG. 1-3, i.e. as base station 3, 3a or 3b. The base station 50 of FIG. 6 may further be used to implement a method of managing a list of records of access points that are located within its coverage area. An embodiment of such a method has been discussed with reference to FIG. 4.

The base station 50 comprises a processor 51 communicatively coupled to a database 53. In the database 53, a list of records of access points within a first network may be stored, the access points being located within the coverage area of the base station 50. The base station is part of a second network. The base station 50 further comprises a receiver 57 and a transmitter 59. The receiver 57 and the transmitter 59 are arranged to communicate via a communication interface within the second network, and may be able to communicate via a communication interface within the first network as well. In embodiments, the base station 50 may further comprise an interface 58. The interface 58 may be connected to a fixed network, e.g. Internet or a PSTN.

Figure 7:
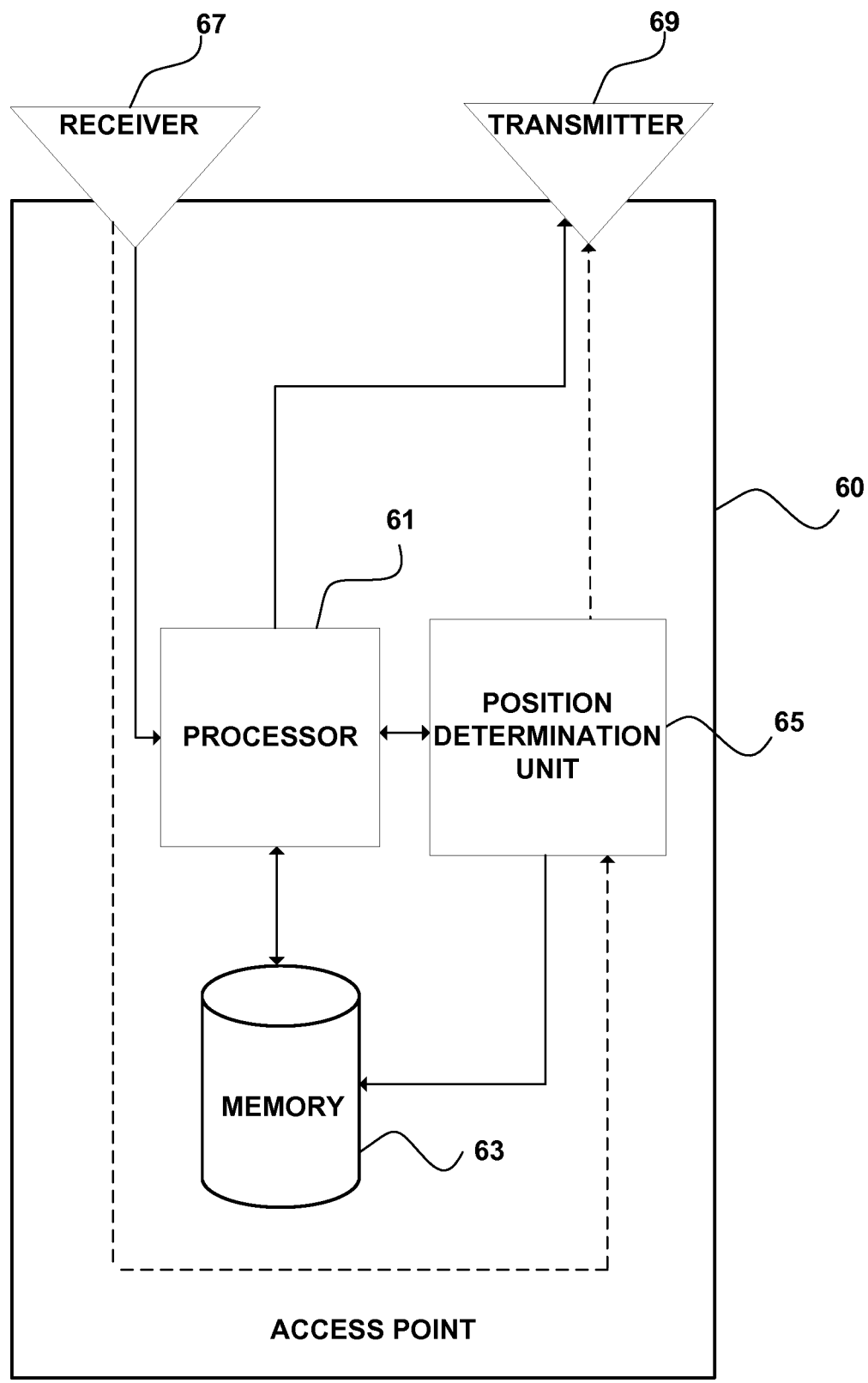
FIG. 7 schematically depicts an embodiment of an access point that may be used in embodiments.

FIG. 7 schematically depicts an embodiment of an access point 60 that may be used in embodiments, i.e. an access point within the first network. The access point 60 comprises a processor 61, a memory 63, a receiver 67, and a transmitter 69.

The receiver 67 may be arranged to receive signals from a mobile device. The receiver 67 may further be arranged to detect one or more base stations within the second network.

The processor 61 may comprise a control unit to control signals received by the receiver 67 and signals to be sent via the transmitter 69, e.g. for the purpose of controlling detection of base stations or for the purpose of responding to signals received from a mobile device. Alternatively, or additionally, the processor 61 may enable transmission of the access point identifier and position information of the access point in a different way, e.g. by transmission via a fixed network like Internet or a PSTN.

The access point memory 63 is configured to store or stores an access point identifier and position information of the access point 60. The access point identifier may already have been stored in the access point memory 63 at the time of manufacturing. The data regarding the position of the access point 60 may be provided via a user interface (not shown), e.g. via a keyboard, touch screen, etc.

The transmitter 69 may be arranged to transmit the access point identifier and the position information of the access point, e.g. in response to a signaling request received from a mobile device. Furthermore, the transmitter 69 may transmit the access point identifier and the position information to one or more detected base stations, in particular if the respective base station is part of the first network and located within the coverage area of the access point 60.

The position information of the access point may be in any format known to a person skilled in the art. For example, the position information may take the form of x- and y-coordinates (optionally also a z-coordinate), longitude-latitude coordinates (optionally an altitude coordinate as well) or relate a certain type of coding, e.g. a postal code or a postal address.

In an embodiment, the access point 60 further comprises a position determination unit 65 for determining the position of the access point 60. The position determination unit 65 may make use of the receiver 67 and the transmitter 69 of the access point 60 for this purpose. If the position has been determined, the position may be stored in the access point memory 63. The location determination unit may comprise a global positioning system (GPS) receiver.

In FIG. 7, data transferred in view of the determining of a position by means of a position determination unit has been shown with the dashed arrows. Data related to the scanning action, has been depicted by means of the solid arrows.

The invention has been described by reference to certain embodiments discussed above. It will be recognized that these embodiments are susceptible to various modifications and alternative forms well known to those of skill in the art.

Abbreviations

CDMA2000 Code Division Multiple Access 2000
DECT Digital Enhanced Cordless Telecommunications
DVB Digital Video Broadcasting
GSM Global System for Mobile telecommunications
InMarS at International Mobile Satellite Organization
IS-95 Interim Standard 95
LBS Location Based Services
LTE Long Term Evolution
MAC Media Access Control
NFC Near Field Communication
RFID Radio Frequency Identification
SSID Service Set Identifier
TETRA Terrestrial Trunked Radio
UMTS Universal Mobile Telecommunications System
UWB Ultra Wide Band
WCDMA Wideband Code Division Multiple Access
WIMAX Worldwide Interoperability for Microwave Access
WLAN Wireless Local Area Network

The invention claimed is:

1. A method of determining a location of a mobile device in a first communication network, wherein the mobile device is in communication with a cellular base station in a second communication network, the method comprising:

detecting access points within the first communication network with said mobile device;

selecting one or more of the detected access points based on information provided by the cellular base station, wherein said information provided by the cellular base station comprises access point records regarding access points verified by the cellular base station as being located within a coverage area of the cellular base station, wherein selecting one or more of the detected access points based on information provided by the cellular base station comprises selecting the one or more detected access points from among the access points verified by the cellular base station as being located within the coverage area of the cellular base station; and determining the location of the mobile device based on the selected detected access points, wherein access points verified by the cellular base station as being located within a coverage area of the cellular base station comprise given access points for which, for each given access point, (i) the given access point reported to the cellular base station that the given access point is located in the coverage area and (ii) the cellular base station received feedback from one or more mobile devices in the coverage area of the cellular base station confirming that the given access point is actually located in the coverage area.

2. The method of claim 1, wherein said selecting comprises excluding detected access points that have not been verified by the cellular base station as being located within the coverage area of the cellular base station.

3. The method of claim 1, wherein said access point records comprise, for a respective access point, information representative of a position of the respective access point.

4. The method of claim 1, wherein said access point records comprise, for a respective access point, information representative of an identity of the respective access point.

5. The method of claim 1, wherein said detecting comprises determining a position of a detected access point.

6. The method of claim 1, wherein said detecting comprises determining an identity of a detected access point.

7. The method of claim 1, wherein the location of the mobile device is determined based on information representative of respective positions of the selected detected access points.

8. The method of claim 1, wherein said information provided by the cellular base station is provided in a list, and wherein said list is provided in response to sending a request towards the cellular base station.

9. The method of claim 1, wherein said information provided by the cellular base station is provided in a list, and wherein said list is provided via a broadcast channel.

10. The method of claim 1, wherein a nominal coverage area of the cellular base station in the second communication network is larger than a nominal coverage area of an access point within said first communication network.

11. The method of claim 1, further comprising reporting to the cellular base station in the second communication network which access points in the first communication network have been detected.

12. A mobile device arranged to be part of a first communication network and a second communication network, the mobile device comprising:
a receiver for receiving data from one or more access points in at least one of the first communication network or the second communication network;
a transmitter for transmitting data towards one or more access points in at least one of the first communication network or the second communication network;
a memory for storing data; and
a processor for processing data, wherein the data is at least one of received via said receiver or stored in said memory;
wherein the mobile device is arranged to determine a location of the mobile device in the first communication network based on the method of claim 1.

13. A method of determining a location of a mobile device in a first communication network, wherein the mobile device is in communication with a cellular base station in a second communication network, the method comprising:
detecting access points within the first communication network with said mobile device;
selecting one or more of the detected access points based on information provided by the cellular base station, wherein said information provided by the cellular base station comprises access point records regarding access points verified by the cellular base station as being located within a coverage area of the cellular base station, wherein selecting one or more of the detected access points based on information provided by the cellular base station comprises selecting the one or more detected access points from among the access points verified by the cellular base station as being located within the coverage area of the cellular base station; and
determining the location of the mobile device based on the selected detected access points, wherein access points verified by the cellular base station as being located within a coverage area of the cellular base station comprise given access points for which the cellular base station verifies, for each given access point, a reported position of the given access point via messaging with the given access point through at least one of the first and second communication networks.

14. The method of claim 13, wherein said selecting comprises excluding detected access points that have not been verified by the cellular base station as being located within the coverage area of the cellular base station.

15. The method of claim 13, wherein said access point records comprise, for a respective access point, information representative of a position of the respective access point.

16. The method of claim 13, wherein said access point records comprise, for a respective access point, information representative of an identity of the respective access point.

17. The method of claim 13, wherein said detecting comprises determining a position of a detected access point.

18. The method of claim 13, wherein said detecting comprises determining an identity of a detected access point.

19. The method of claim 13, wherein the location of the mobile device is determined based on information representative of respective positions of the selected detected access points.

20. The method of claim 13, wherein said information provided by the cellular base station is provided in a list, and wherein said list is provided in response to sending a request towards the cellular base station.

21. The method of claim 13, wherein said information provided by the cellular base station is provided in a list, and wherein said list is provided via a broadcast channel.

22. The method of claim 13, wherein a nominal coverage area of the cellular base station in the second communication network is larger than a nominal coverage area of an access point within said first communication network.

23. The method of claim 13, further comprising reporting to the cellular base station in the second communication network which access points in the first communication network have been detected.

24. A mobile device arranged to be part of a first communication network and a second communication network, the mobile device comprising:

a receiver for receiving data from one or more access points in at least one of the first communication network or the second communication network;
a transmitter for transmitting data towards one or more access points in at least one of the first communication network or the second communication network;
a memory for storing data;
a processor for processing data, wherein the data is at least one of received via said receiver or stored in said memory;
wherein the mobile device is arranged to determine a location of the mobile device in the first communication network based on the method of claim 13.

* * * * *